(12) United States Patent
Marsh, II

(10) Patent No.: US 8,684,138 B1
(45) Date of Patent: Apr. 1, 2014

(54) HUNTING STAND ASSEMBLY

(76) Inventor: John E. Marsh, II, Hooksett, NH (US)

( * ) Notice: Subject to any disclaimer, the term of this patent is extended or adjusted under 35 U.S.C. 154(b) by 130 days.

(21) Appl. No.: 13/328,653

(22) Filed: Dec. 16, 2011

(51) Int. Cl.
E06C 7/16 (2006.01)

(52) U.S. Cl.
USPC .......................................... 182/116; 182/141

(58) Field of Classification Search
USPC .................. 182/115, 116, 129, 141, 187, 107
See application file for complete search history.

(56) References Cited

U.S. PATENT DOCUMENTS

| 369,491 | A | * | 9/1887 | Allan | 182/173 |
| 2,319,893 | A | * | 5/1943 | Tuttle | 248/210 |
| 3,057,431 | A | * | 10/1962 | George | 182/163 |
| 3,741,338 | A | * | 6/1973 | Durand et al. | 182/155 |
| 3,967,694 | A | * | 7/1976 | Woolfolk, Sr. | 182/82 |
| D282,320 | S | | 1/1986 | Anderson | |
| 5,105,908 | A | * | 4/1992 | Freund | 182/20 |
| 5,195,611 | A | * | 3/1993 | Untz | 182/187 |
| 5,607,143 | A | | 3/1997 | Regal | |
| 5,791,436 | A | * | 8/1998 | Talley, Sr. | 182/116 |
| 6,079,517 | A | | 6/2000 | Payne | |
| D431,890 | S | | 10/2000 | Twilligear et al. | |
| 6,186,271 | B1 | * | 2/2001 | Borries et al. | 182/20 |
| 6,830,128 | B2 | * | 12/2004 | Burgeson | 182/116 |
| 7,168,522 | B1 | | 1/2007 | Price | |
| 7,314,406 | B2 | | 1/2008 | Bilinovich | |
| 7,350,769 | B1 | | 4/2008 | Dorzok | |
| 7,458,563 | B1 | | 12/2008 | Liu | |
| 8,122,998 | B2 | * | 2/2012 | Liles | 182/20 |
| 2004/0084248 | A1 | * | 5/2004 | Burgeson | 182/116 |
| 2008/0169155 | A1 | * | 7/2008 | Broberg | 182/187 |
| 2009/0229914 | A1 | * | 9/2009 | Liles | 182/63.1 |
| 2011/0214943 | A1 | * | 9/2011 | McElroy | 182/107 |
| 2012/0000727 | A1 | * | 1/2012 | Mason | 182/141 |

* cited by examiner

Primary Examiner — Charles A Fox
Assistant Examiner — Kristine Florio

(57) ABSTRACT

A hunting stand assembly is provided for facilitating erection and positioning of the hunting stand by one person. The assembly includes a base assembly configured for coupling to a support surface and a support assembly configured for securing to a tree. An elongated stand is configured for propping against the tree. A lower end of the stand is pivotally coupled to the base assembly. A pulley assembly has a first end coupled to the support assembly and a second end coupled to the stand. A lift rope extends between the first end of the pulley assembly and the second end of the pulley assembly such that pulling a free end of the lift rope urges the first end towards the second end. Thus, the stand is urged to pivot towards the support assembly and into a desired position against the tree.

12 Claims, 4 Drawing Sheets

HUNTING STAND ASSEMBLY

BACKGROUND OF THE DISCLOSURE

Field of the Disclosure

The disclosure relates to hunting stands and more particularly pertains to a new hunting stand for facilitating erection and positioning of the hunting stand by one person.

SUMMARY OF THE DISCLOSURE

An embodiment of the disclosure meets the needs presented above by generally comprising a base assembly configured for coupling to a support surface and a support assembly configured for securing to a tree. An elongated stand is configured for propping against the tree. A lower end of the stand is pivotally coupled to the base assembly. A pulley assembly has a first end coupled to the support assembly and a second end coupled to the stand. A lift rope extends between the first end of the pulley assembly and the second end of the pulley assembly such that pulling a free end of the lift rope urges the first end towards the second end. Thus, the stand is urged to pivot towards the support assembly and into a desired position against the tree.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
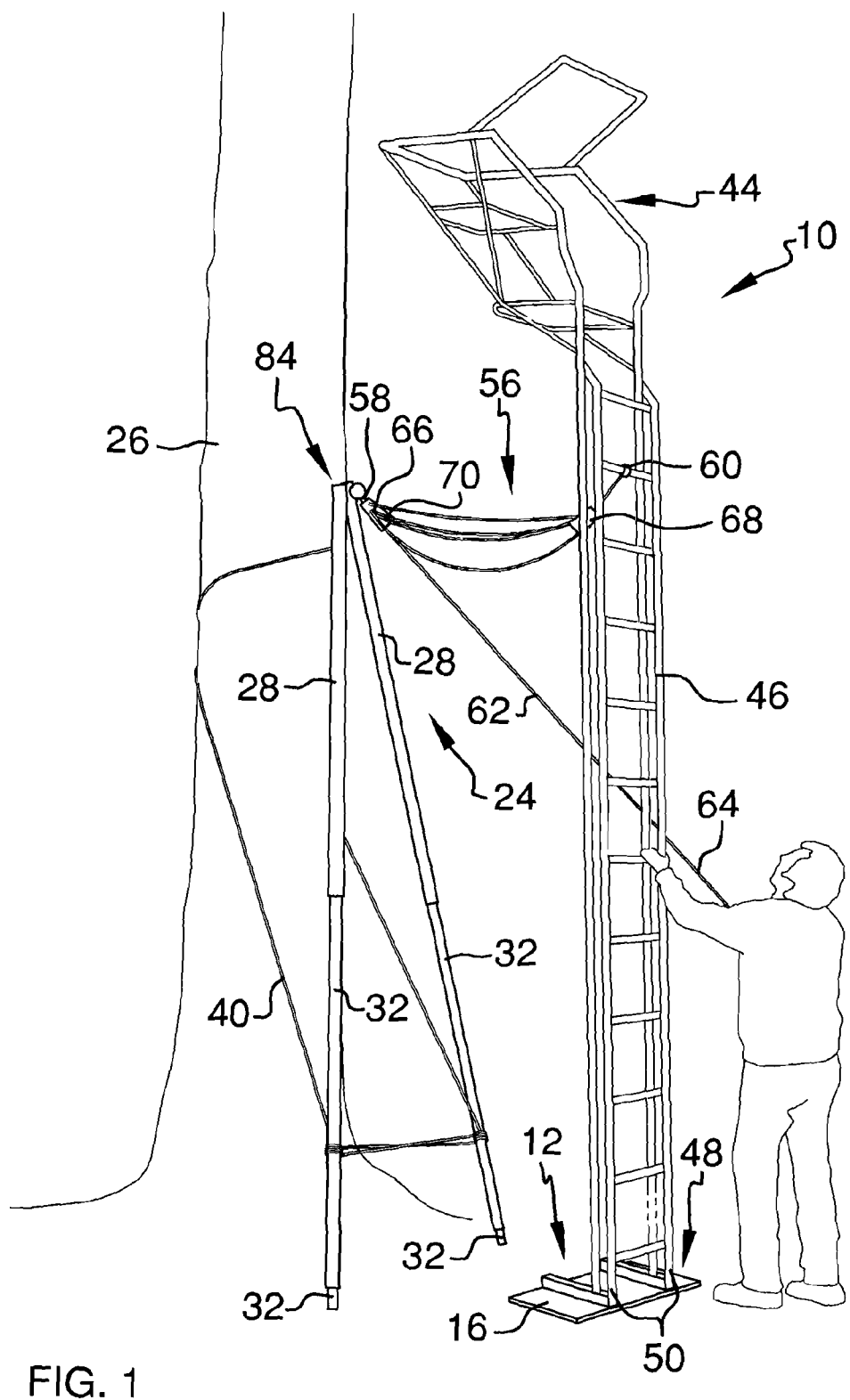
FIG. 1 is a top front side perspective view of a hunting stand assembly according to an embodiment of the disclosure.
Figure 2:
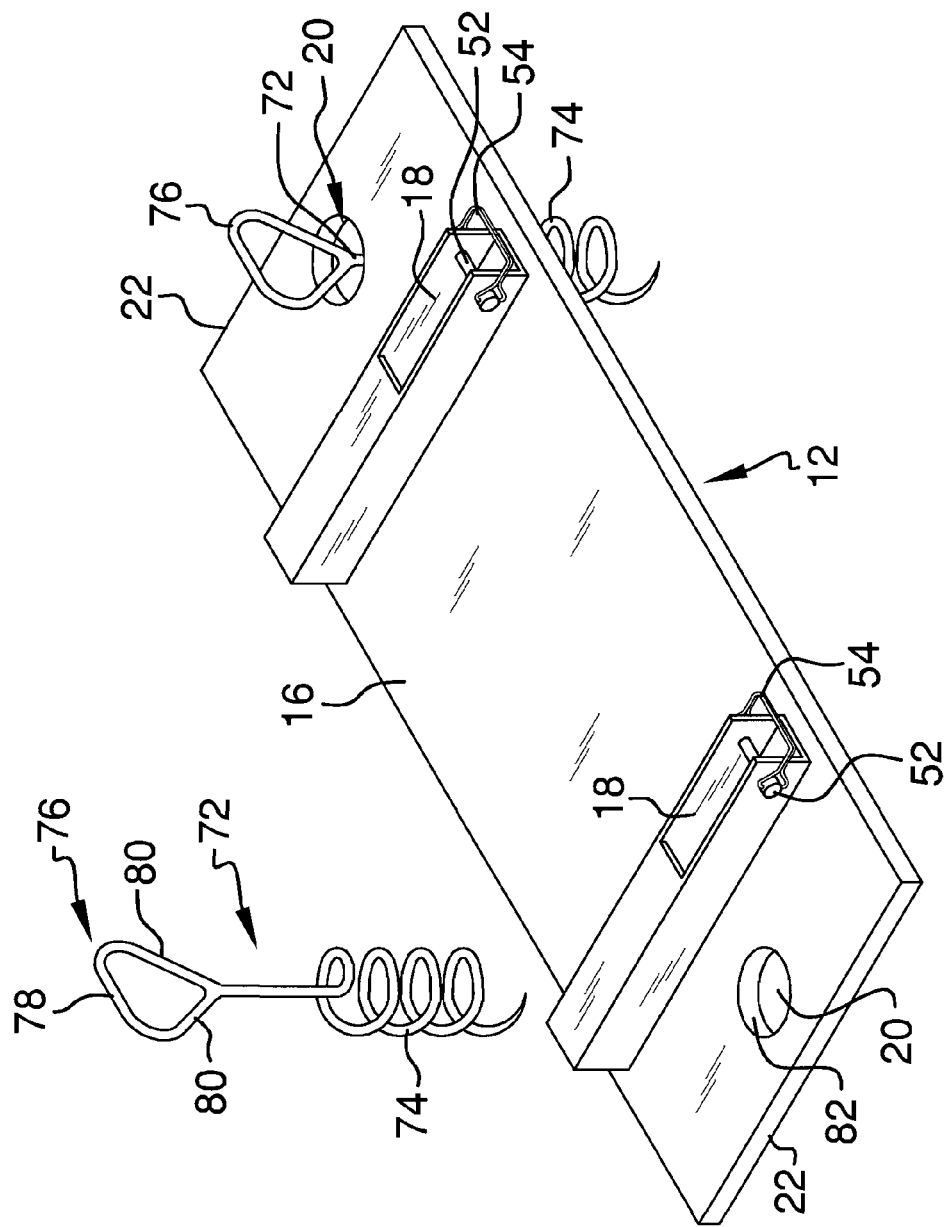
FIG. 2 is a top front side perspective view of a base assembly of an embodiment of the disclosure.
Figure 3:
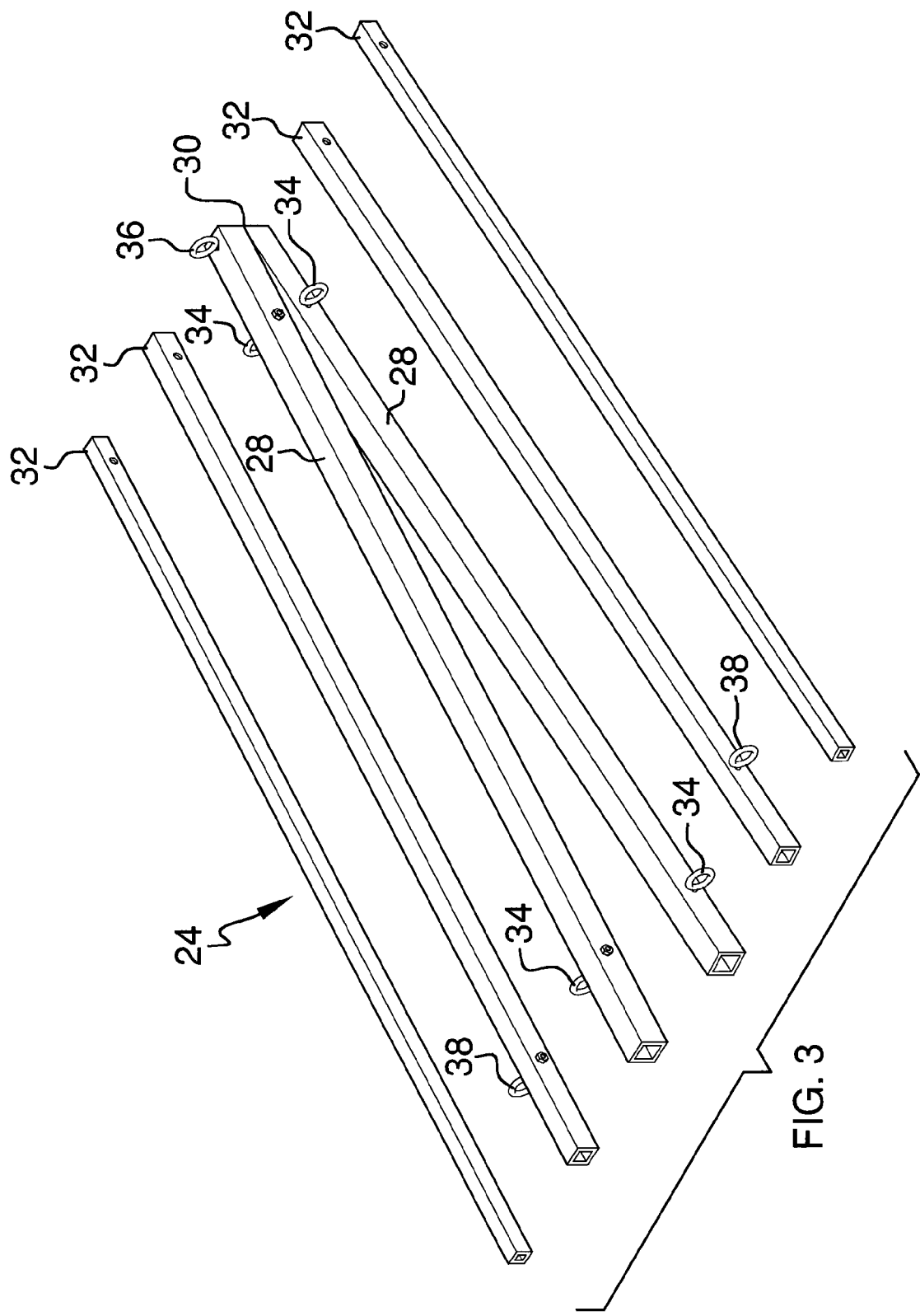
FIG. 3 is a bottom front side perspective view of a support assembly of an embodiment of the disclosure.
Figure 4:
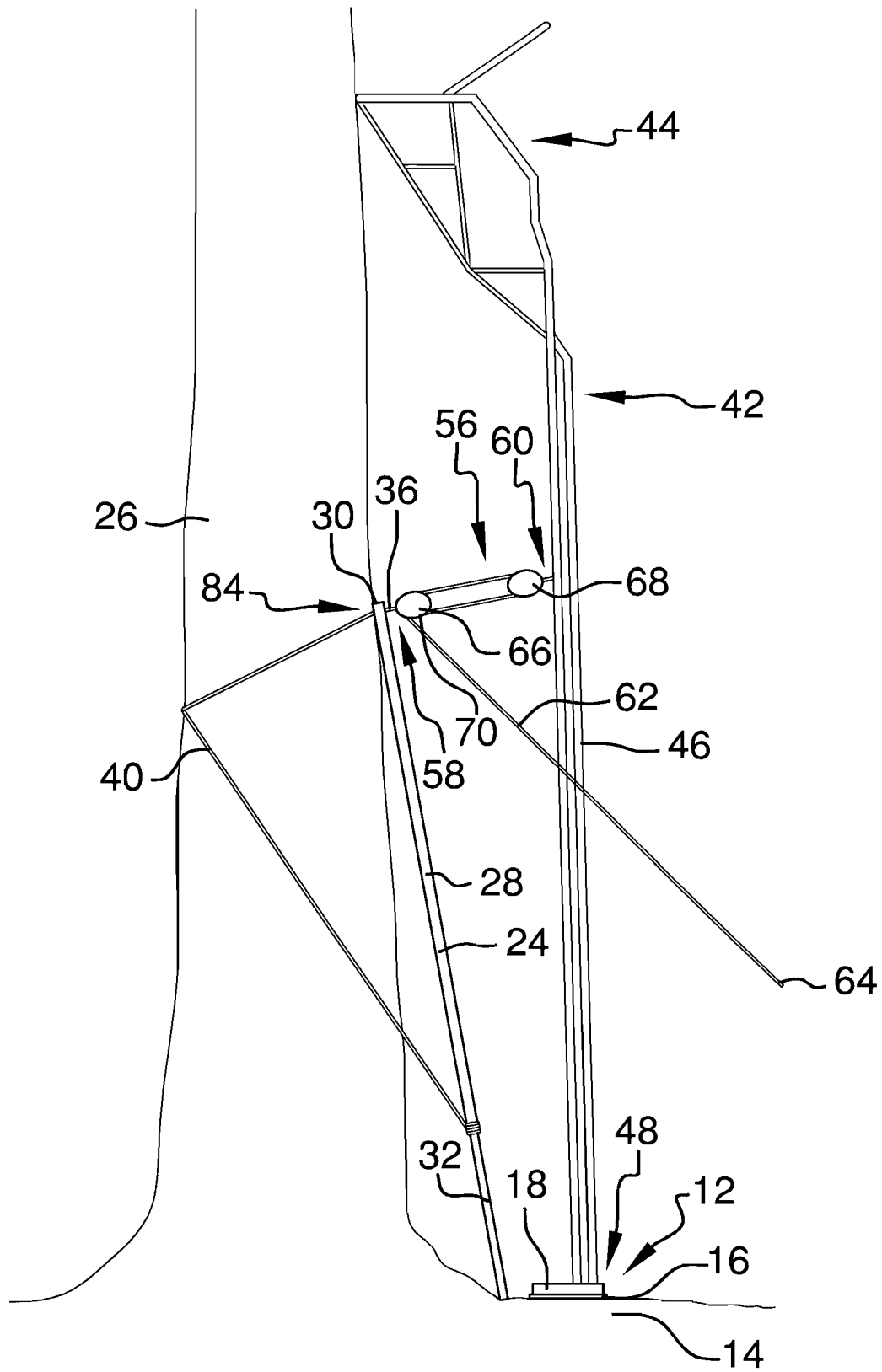
FIG. 4 is a side view of an embodiment of the disclosure.

With reference now to the drawings, and in particular to FIGS. 1 through 4 thereof, a new hunting stand embodying the principles and concepts of an embodiment of the disclosure and generally designated by the reference numeral 10 will be described.

As best illustrated in FIGS. 1 through 4, the hunting stand assembly 10 generally comprises a base assembly 12 configured for coupling to a support surface 14. The base assembly 12 includes an elongated planar member 16 and a pair of spaced sockets 18 coupled to the planar member 16. A pair of spaced apertures 20 is provided in the planar member 16. Each aperture 20 is positioned proximate an associated end 22 of the planar member 16.

A support assembly 24 is configured for securing to a tree 26. The support assembly 24 has a pair of legs 28. Upper ends 30 of the legs 28 are pivotally coupled together permitting the legs 28 to be pivoted together for storage and transport or expanded for use. The support assembly 24 may include a plurality of extension members 32. Each extension member 32 is coupled to one of the legs 28. The extension members 32 may be separate and mechanically joined to the legs 28 or the extension members 32 may be telescopically coupled to the legs 28. The support assembly 24 also has a plurality of support loops 34 coupled to the legs 28 and a pulley ring 36 coupled to the support assembly 24 proximate the upper ends 30 of the legs 28. Thus, the pulley ring 36 is positioned adjacent a top 84 of the support assembly 24 in an elevated position when the support assembly 24 is secured to the tree 26. A plurality of extension loops 38 may also be provided in the support assembly 24. Each extension loop 38 is coupled to an associated one of the extension members 32. A line 40 is coupled to the support assembly 24. The line 40 is strung and secured through the support loops 34 and the extension loops 38 whereby the line 40 secures the stand assembly 24 to the tree 26.

An elongated stand 42 is configured for propping against the tree 26. The stand 42 has a perch portion 44 and a ladder portion 46 coupled to and extending downwardly from the perch portion 44. A lower end 48 of the stand 42 is pivotally coupled to the base assembly 12. The lower end 48 of the stand 42 includes a pair of spaced posts 50. Each post 50 is inserted into an associated one of the sockets 18. A pair of locking pins 52 is provided. Each locking pin 52 is inserted through an associated one of the sockets 18 and the post 50 inserted into the associated one of the sockets 18 whereby the stand 42 is pivotally coupled to the base assembly 12. A retainer 54 may be coupled to the locking pin 52 to prevent the locking pin 52 from prematurely disengaging from the socket 18 and post 50.

A pulley assembly 56 has a first end 58 coupled to the support assembly 24 and a second end 60 coupled to the stand 42. The pulley assembly 56 includes a lift rope 62 extending between the first end 58 of the pulley assembly 56 and the second end 60 of the pulley assembly 56. The lift rope 62 has a free end 64. Pulling the free end 64 of the lift rope 62 urges the first end 58 towards the second end 60 whereby the stand 42 is urged to pivot towards the support assembly 24. The first end 58 of the pulley assembly 56 is coupled to the pulley ring 36. More specifically, the pulley assembly 56 may have a first pulley 66 and a second pulley 68. The lift rope 62 may have a first end 70 coupled to one of the first pulley 66 and the second pulley 68. The lift rope 62 extends through and is operationally engaged the first pulley 66 and the second pulley 68 whereby pulling on the free end 64 of the lift rope 62 urges the first pulley 66 towards the second pulley 68.

A pair of spikes 72 is also provided. Each spike 72 has an insertion portion 74 and a head portion 76. The insertion portion 74 may be spiral such that it is configured for insertion and engagement to the support surface 14. The head portion 76 engages the planar member 16 when the insertion portion 74 of the spike 72 is fully inserted through one of the apertures 20 in the planar member 16. Thus, each spike 72 is configured for securing the base assembly 12 in a static position relative to the support surface 14. The head portion 76 of each spike 72 may be generally triangular forming a handle 78 and a pair of sides 80 extending between the handle 78 and the insertion portion 74 of the spike 72. The sides 80 contact and engage an edge 82 defining the aperture 20 to hold the base assembly 12 in a static position relative to the support surface 14.

In use, the assembly 10 is transported to a desired location. The base assembly 12 may be semi-permanently attached to the stand 42 as described above or attached to the stand 42 on site. The support assembly 42 is assembled and coupled to a chosen tree 26 using line 40. The stand 42 is positioned as desired and the base assembly 12 is fixed to the support surface 14 using spikes 72. The pulley assembly 56 is attached between the support assembly 24 and the stand 42. Pulling the free end 64 of the lift rope 62 urges the stand 42 to pivot on the base assembly 12 into the desired position. The stand 42 may then be secured in the desired position by use of another rope secured to the tree 26 of by securing the lift rope 62 to hold the pulley assembly 56 in a compact position preventing the stand 42 from pivoting away from the tree 26.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A hunting stand assembly comprising:
    a base assembly configured for coupling to a support surface;
    a support assembly configured for securing to a tree, said support assembly having a pair of legs, upper ends of said legs being pivotally coupled together, said support assembly having a plurality of support loops coupled to said legs;
    an elongated stand configured for propping against the tree, a lower end of said stand being pivotally coupled to said base assembly; and
    a pulley assembly having a first end coupled to said support assembly, a second end coupled to said stand, and a lift rope extending between said first end of said pulley assembly and said second end of said pulley assembly such that pulling a free end of said rope urges said first end towards said second end whereby said stand is urged to pivot towards said support assembly.

2. The assembly of claim 1, further including said support assembly having a plurality of extension members, each extension member being coupled to one of said legs.

3. The assembly of claim 1, further comprising:
    a pulley ring coupled to said support assembly proximate said upper ends of said legs; and
    said first end of said pulley assembly being coupled to said pulley ring.

4. The assembly of claim 2, further including a plurality of extension loops, each extension loop being coupled to an associated one of said extension members.

5. The assembly of claim 1, further including a line coupled to said support assembly, said line being configured for securing said stand assembly to the tree.

6. The assembly of claim 1, further comprising:
    said base assembly including a pair of spaced sockets;
    said lower end of said stand having a pair of spaced posts, each said post being inserted into an associated one of said sockets; and
    a pair of locking pins, each locking pin being inserted through an associated one of said sockets and said post inserted into said associated one of said sockets whereby said stand is pivotally coupled to said base assembly.

7. The assembly of claim 1, further comprising:
    said base assembly including an elongated planar member;
    a pair of spaced apertures, each said aperture being positioned proximate an associated end of said planar member; and
    a pair of spikes, each spike having an insertion portion and a head portion, said insertion portion being configured for insertion and engagement to the support surface, said head portion engaging said planar member when said insertion portion of said spike is inserted through one of said apertures whereby each said spike is configured for securing said base assembly in a static position relative to the support surface.

8. The assembly of claim 7, further including said insertion portion of each said spike being spiral.

9. The assembly of claim 8, further including said head portion of each said spike having a handle and a pair of sides extending between said handle and said insertion portion of said spike.

10. The assembly of claim 1, further including said pulley assembly having a first pulley and a second pulley, said lift rope having a first end coupled to one of said first pulley and said second pulley, said lift rope extending through and operationally engaging said first pulley and said second pulley whereby pulling on said free end of said lift rope urges said first pulley towards said second pulley.

11. The assembly of claim 1, further including said stand having a perch portion and a ladder portion, said ladder portion being coupled to and extending downwardly from said perch portion.

12. A hunting stand assembly comprising:
    a base assembly configured for coupling to a support surface, said base assembly including an elongated planar member, said base assembly including a pair of spaced sockets coupled to said planar member;
    a pair of spaced apertures in said planar member, each said aperture being positioned proximate an associated end of said planar member;
    a support assembly configured for securing to a tree, said support assembly having a pair of legs, upper ends of said legs being pivotally coupled together, said support assembly having a plurality of extension members, each extension member being coupled to one of said legs, said support assembly having a plurality of support loops coupled to said legs, a pulley ring coupled to said support assembly proximate said upper ends of said legs, and a plurality of extension loops, each extension loop being coupled to an associated one of said extension members;
    a line coupled to said support assembly, said line being secured through said support loops and said extension loops whereby said line is configured for securing said stand assembly to the tree;
    an elongated stand configured for propping against the tree, said stand having a perch portion and a ladder portion, said ladder portion being coupled to and extending downwardly from said perch portion, a lower end of said stand being pivotally coupled to said base assembly, said lower end of said stand having a pair of spaced posts, each said post being inserted into an associated one of said sockets;

a pair of locking pins, each locking pin being inserted through an associated one of said sockets and said post inserted into said associated one of said sockets whereby said stand is pivotally coupled to said base assembly;

a pulley assembly having a first end coupled to said support assembly, a second end coupled to said stand, and a lift rope extending between said first end of said pulley assembly and said second end of said pulley assembly such that pulling a free end of said rope urges said first end towards said second end whereby said stand is urged to pivot towards said support assembly, said first end of said pulley assembly being coupled to said pulley ring, said pulley assembly having a first pulley and a second pulley, said lift rope having a first end coupled to one of said first pulley and said second pulley, said lift rope extending through and operationally engaging said first pulley and said second pulley whereby pulling on said free end of said lift rope urges said first pulley towards said second pulley; and a pair of spikes, each spike having an insertion portion and a head portion, said insertion portion being configured for insertion and engagement to the support surface, said head portion engaging said planar member when said insertion portion of said spike is inserted through one of said apertures whereby each said spike is configured for securing said base assembly in a static position relative to the support surface, said insertion portion of each said spike being spiral, said head portion of each said spike having a handle and a pair of sides extending between said handle and said insertion portion of said spike.

* * * * *